(12) United States Patent
Nakamori et al.

(10) Patent No.: US 10,589,497 B2
(45) Date of Patent: Mar. 17, 2020

(54) BIAXIALLY ORIENTED POLYESTER FILM

(71) Applicant: Toray Industries, Inc., Tokyo (JP)

(72) Inventors: Yukari Nakamori, Otsu (JP); Takuji Higashioji, Otsu (JP); Masato Horie, Anpachi-gun (JP)

(73) Assignee: Toray Industries, Inc., Tokyo (JP)

( * ) Notice: Subject to any disclaimer, the term of this patent is extended or adjusted under 35 U.S.C. 154(b) by 304 days.

(21) Appl. No.: 15/520,247

(22) PCT Filed: Oct. 19, 2015

(86) PCT No.: PCT/JP2015/079472
§ 371 (c)(1),
(2) Date: Apr. 19, 2017

(87) PCT Pub. No.: WO2016/063840
PCT Pub. Date: Apr. 28, 2016

(65) Prior Publication Data
US 2017/0313042 A1 Nov. 2, 2017

(30) Foreign Application Priority Data
Oct. 20, 2014 (JP) ................................ 2014-213401

(51) Int. Cl.
| B32B 27/36 | (2006.01) |
| B32B 27/08 | (2006.01) |
| G11B 5/73 | (2006.01) |
| B32B 33/00 | (2006.01) |
| G11B 5/64 | (2006.01) |
| B29C 48/08 | (2019.01) |
| B29C 48/00 | (2019.01) |
| B29C 48/21 | (2019.01) |
| B29C 55/14 | (2006.01) |
| B29K 67/00 | (2006.01) |

(52) U.S. Cl.
CPC .............. *B32B 27/36* (2013.01); *B32B 27/08* (2013.01); *B32B 33/00* (2013.01); *G11B 5/645* (2013.01); *G11B 5/7305* (2013.01); *B29C 48/0018* (2019.02); *B29C 48/08* (2019.02); *B29C 48/21* (2019.02); *B29C 55/143* (2013.01); *B29K 2067/003* (2013.01); *B32B 2255/10* (2013.01); *B32B 2264/02* (2013.01); *B32B 2264/025* (2013.01); *B32B 2264/0235* (2013.01); *B32B 2264/10* (2013.01); *B32B 2264/102* (2013.01); *B32B 2264/104* (2013.01); *B32B 2307/20* (2013.01); *B32B 2307/518* (2013.01); *B32B 2307/72* (2013.01); *B32B 2307/732* (2013.01); *B32B 2307/734* (2013.01); *B32B 2429/02* (2013.01); *B32B 2457/202* (2013.01)

(58) Field of Classification Search
None
See application file for complete search history.

(56) References Cited

U.S. PATENT DOCUMENTS

| 5,516,574 A  *  5/1996 | Ogawa | .................... B32B 27/36 |
| | | 428/143 |
| 2007/0281186 A1 * 12/2007 | Yoshida | .................. B32B 5/142 |
| | | 428/847.4 |

FOREIGN PATENT DOCUMENTS

| JP | 06-65403 A | 3/1994 |
| JP | 07-68726 A | 3/1995 |
| JP | 2001-341265 A | 12/2001 |
| JP | 2003-191414 A | 7/2003 |
| JP | 2004-299057 A | 10/2004 |
| JP | 2012-153099 A | 8/2012 |
| JP | 2012-153100 A | 8/2012 |
| JP | 2014-189717 A | 10/2014 |

OTHER PUBLICATIONS

English translation of JP 2014-189717, dated Oct. 2014, pp. 1-39.*
Notice of Reasons for Refusal dated Sep. 20, 2019, of counterpart Japanese Application No. 2015-553335, along with an English translation.

* cited by examiner

Primary Examiner — Holly C Rickman
(74) Attorney, Agent, or Firm — DLA Piper LLP (US)

(57) ABSTRACT

A biaxially orientated polyester film has a $P_L/V_L$ ratio of 0.3 to 1.2, $P_L$ and $V_L$ representing the average diameter of the convex portions and the average diameter of the concave portions, respectively, that are defined on the basis of a slice level with a height of 0 nm (reference plane) in a roughness curve determined for at least one surface using a three dimensional surface roughness meter, and the convex portions accounting for an area ratio of 30% to 51% of the reference plane. The biaxially oriented polyester film is excellent in travelling property, slitting property, and dimensional stability, and serves, when used for magnetic recording medium production, to provide a high density magnetic recording medium having a smooth magnetic layer, suffering little dimensional change due to variations in environmental parameters such as temperature and humidity or due to storage, and having good electromagnetic conversion characteristics with little dropout.

8 Claims, No Drawings

BIAXIALLY ORIENTED POLYESTER FILM

TECHNICAL FIELD

This disclosure relates to a biaxially oriented polyester film having excellent travelling and slitting properties as well as excellent dimensional stability and surface characteristics, and also serves favorably as optical films, various release films, next generation thermal transfer ribbons that require ultrafine surface properties, and base films of coating type magnetic recording media for data storage and the like.

BACKGROUND

Biaxially oriented polyester film has been used for various applications because of its excellent thermal properties, dimensional stability, mechanical properties, and easy control of surface morphology and, in particular, it is well-known for its usefulness as a material as a support for magnetic recording media. There have been demands for magnetic recording media suitable for higher density recording and, to further improve the high density recording capability, it is effective to further improve the smoothness of magnetic layer surfaces by using thinner magnetic layers and finer particulate magnetic material.

As a support for magnetic recording media that contains recently developed ferromagnetic hexagonal ferrite powder, there are restrictions not only on the improvement of the smooth surfaces but also on the roughening of the travelling surfaces in developing thinner magnetic layers, nonmagnetic layers, and back coat layers. Various problems can occur when magnetic recording media are stored in the form of rolls in the manufacturing process. Specifically, protrusions formed on the travelling surface are transferred to the magnetic surface to form recesses on the surface of the smooth magnetic layer, or large particles contained in the support are pushed up toward the smooth surface to generate a gentle convex undulation over the surface of the magnetic layer to decline the smoothness of the surface of the magnetic layer. If the diameter of the particles contained in the support is reduced with the aim of improving the smoothness of the surface of the magnetic layer to develop an ultrafine surface with improved smoothness, the magnetic layer will be poor in travelling property, winding property, slitting property, and surface durability.

Thus, the need to improve characteristics such as achieving traveling property and slit property together with surface smoothness can be said to always occur when developing high-density recording media.

To solve the above problems, there have been studies on the use of a polyester film that contains fine particles to control the roughness as well as the height and number of protrusions on the film surface and to depress their transfer to the magnetic layer surface (for example, Japanese Unexamined Patent Publication (Kokai) No. 2012-153100). However, even if protrusions of a specific height and size formed on the surface of the base film on the back coat layer side are defined, it still will not reduce the number of coarse protrusions or prevent reduction in the smoothness of the magnetic surface caused by their transfer when applied to a support for magnetic recording media of ferromagnetic hexagonal ferrite powder that have a thin magnetic layer and back coat layer with ultrafine surfaces. Furthermore, due to a large laminate thickness on the side where the magnetic layer is not formed, it is still impossible to eliminate the decline in the smoothness on the magnetic layer side caused by surface protrusions pushed up toward the opposite surface (the magnetic layer side). Moreover, as the height of the protrusions decreases as a result of reducing the diameter of the particles contained, the number of protrusions having a sufficient height to contribute to the travelling property decreases, allowing the problems of poor travelling property, winding property, and surface abrasion resistance to persist. In addition, there have been studies aiming to provide a polyester film whose polyester film surface undulation is controlled within a specific range to achieve both excellent winding property and electromagnetic conversion characteristics (for example, Japanese Unexamined Patent Publication (Kokai) Nos. 2012-153099, 2003-191414 and 2004-299057) or a method that applies a primer on either or both sides of a polyester film to allow the polyester film to have both good travelling property and smoothness (for example, Japanese Unexamined Patent Publication (Kokai) No. 2001-341265). However, when applied to a support for magnetic recording media of ferromagnetic hexagonal ferrite powder requiring an ultrafine surface, production of a magnetic layer with a sufficient surface smoothness is still impossible due to particles pushed up from inside the support and transfer marks of protrusions on the back coat layer surface transferred to the magnetic layer surface. Furthermore, the travelling durability of the primer layer is insufficient and there remain the problem of in-process contamination due to dropping of particles contained.

It could therefore be helpful to provide a biaxially oriented polyester film excellent in winding property, slitting property, and dimensional stability and, when used for magnetic recording medium production, to provide a high density magnetic recording medium having a smooth magnetic layer, suffering little dimensional change due to variations in environmental parameters such as temperature and humidity or due to storage, and having good electromagnetic conversion characteristics with little dropout.

SUMMARY

We found that reduction in defects in the surface of the magnetic layer cannot be eliminated only by controlling the roughness of the travelling surface and the height and number of surface protrusions to prevent a decline in the smoothness of the magnetic layer surface from being caused by the protrusions transferred or pushed up toward the magnetic surface. We also found that there is a variation in the protrusion frequency and there is a correlation between this variation and the decline in the smoothness of the magnetic surface.

We thus provide:

(1) Biaxially orientated polyester film having a $P_L/V_L$ ratio in the range of 0.3 to 1.2, $P_L$ and $V_L$ representing the average diameter of the convex portions and the average diameter of the concave portions, respectively, that are defined on the basis of a slice level with a height of 0 nm (reference plane) in a roughness curve determined from at least one surface using a three dimensional surface roughness meter, and the convex portions accounting for an area ratio of 30% to 51% of the reference plane.

(2) Biaxially orientated polyester film as set forth in paragraph (1), wherein the density of protrusions at slice levels assumed at intervals of 10 nm from the reference plane in the roughness curve determined from at least one surface using a three dimensional surface roughness meter meets the relation given below:

$$0.4 \leq (M60/M10) \times 100 < 10$$

wherein M10 (number/mm$^2$) is the protrusion density at the slice level with a height of 10 nm and M60 (number/mm$^2$) is the protrusion density at the slice level with a height of 60 nm.

(3) Biaxially orientated polyester film as set forth in either paragraph (1) or (2), wherein the average diameter of convex portions ($P_L$) is 2 to 25 μm in the reference plane.

(4) Biaxially orientated polyester film as set forth in any one of paragraphs (1) to (3), wherein the average diameter of concave portions ($V_L$) is 3 to 35 μm in the reference plane.

(5) Biaxially orientated polyester film as set forth in any one of paragraphs (1) to (4), wherein the protrusion density (M100) is 5/mm$^2$ or less at the slice level with a height of 100 nm.

(6) Biaxially orientated polyester film as set forth in any one of paragraphs (1) to (5), wherein the film thickness is 3.5 to 4.5 μm.

(7) Biaxially orientated polyester film as set forth in any one of paragraphs (1) to (6), wherein the humidity expansion coefficient in the width direction is 0 to 6 ppm/% RH.

(8) Biaxially orientated polyester film as set forth in any one of paragraphs (1) to (7) for use as base film of coat-type digital signal magnetic recording media.

The biaxially oriented polyester film can provide a biaxially oriented polyester film excellent in travelling property, slitting property and dimensional stability, and when used for magnetic recording medium production, provides a high density magnetic recording medium having a smooth magnetic layer, suffering little dimensional change due to variations in environmental parameters such as temperature and humidity or due to storage, and having good electromagnetic conversion characteristics with little dropout, and it can also be used favorably as a material for optical films and various release films.

DETAILED DESCRIPTION

Our films and methods are described in detail below based on examples.

The various polyesters that can be used include, for example, those formed of a polymer containing, as a constituent unit (polymerization unit), an acid component such as aromatic dicarboxylic acid, alicyclic dicarboxylic acid, and aliphatic dicarboxylic acid, and a diol component.

Such aromatic dicarboxylic acid components include, for example, terephthalic acid, isophthalic acid, phthalic acid, 1,4-naphthalene dicarboxylic acid, 1,5-naphthalene dicarboxylic acid, 2,6-naphthalene dicarboxylic acid, 4,4'-diphenyl dicarboxylic acid, 4,4'-diphenyl ether dicarboxylic acid, and 4,4'-diphenyl sulfone dicarboxylic, of which terephthalic acid, phthalic acid, and 2,6-naphthalene dicarboxylic acid are preferred. Such alicyclic dicarboxylic acid components include, for example, cyclohexanedicarboxylic acid. Such aliphatic dicarboxylic acid components include, for example, adipic acid, suberic acid, sebacic acid, and dodecanedioic acid. These acid components may be used singly or as a combination of two or more thereof.

Such diol components include, for example, ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2'-bis(4'-β-hydroxyethoxy phenyl) propane, of which ethylene glycol, 1,4-butanediol, 1,4-cyclohexanedimethanol, and diethylene glycol are preferred and ethylene glycol is particularly preferred. These diol components may be used singly or as a combination of two or more thereof.

The polyester to be used may be copolymerized with a monofunctional compound such as lauryl alcohol and phenyl isocyanate or copolymerized with a trifunctional compound and the like such as trimellitic acid, pyromellitic acid, glycerol, pentaerythritol, and 2,4-dioxy benzoic acid, as long as the polymer is in a substantially linear form that is free of excessive branching or crosslinking. In addition to these acid components and diol components, the polymer may be further copolymerized with aromatic hydroxycarboxylic acid such as p-hydroxybenzoic acid, m-hydroxybenzoic acid, and 2,6-hydroxynaphthoic acid or others such as p-aminophenol and p-aminobenzoic acid as long as their amounts are so small that they do not impair the advantageous effect.

The copolymerization ratio of the polymer can be determined by the NMR technique (magnetic nuclear resonance technique) or the microscopic FT-IR technique (Fourier transform microscopic infrared spectroscopy).

Polyester polymers with a glass transition temperature of less than 150° C. can be used favorably because they can be stretched biaxially and can be effective in developing our advantageous features such as dimensional stability. Preferred polyester polymers include polyethylene terephthalate and polyethylene naphthalate (polyethylene-2,6-naphthalate) as well as copolymers thereof, modified products thereof, and polymer alloys thereof with other thermoplastic resins. A polymer alloy as referred to herein is a multicomponent polymer, which may be a block copolymer produced by copolymerization or a polymer blend produced by mixing. The polyester polymer preferably contains polyethylene terephthalate as primary component because processes for increasing the crystallite size, crystal orientation degree and the like can be applied easily to such a polymer. The term "primary component" refers to a component that accounts for 80 mass % or more of the film.

When polyethylene terephthalate is used in the form of a polymer alloy, the other component, which is a thermoplastic resin, is preferably a polymer compatible with the polyester, and it is more preferably polyetherimide resin. Preferred polyetherimide resin polymers include, for example, those shown below:

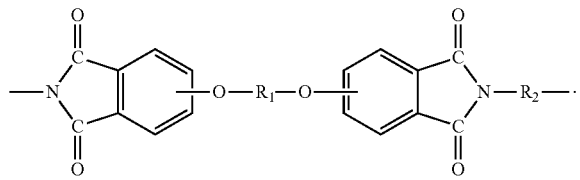

In the above formula, $R_1$ is a divalent aromatic or aliphatic residue having 6 to 30 carbon atoms and $R_2$ is a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group that is chain-terminated with an alkylene group having 2 to 8 carbon atoms.

$R_1$ and $R_2$ may be selected, for example, from the aromatic residues represented by the formulae below:

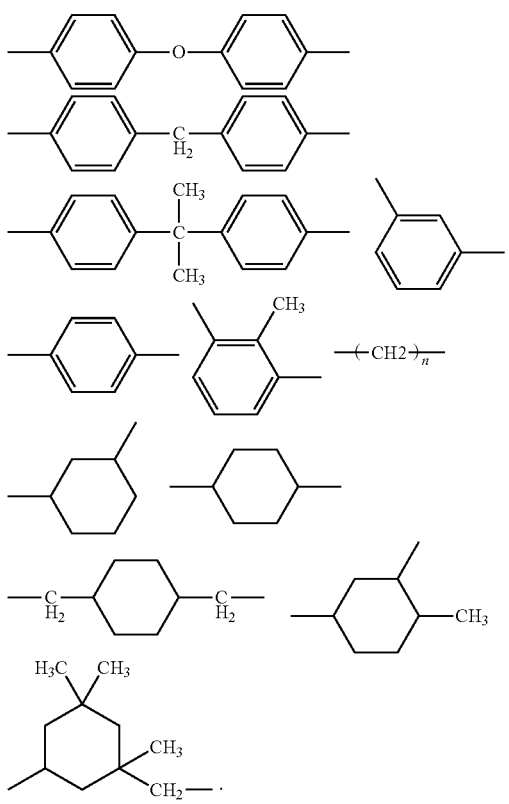

Polymers composed mainly of repeating units as represented by the formulae given below, which are condensation products between 2,2-bis[4-(2,3-dicarboxyphenoxy)phenyl] propane dianhydride and m-phenylene diamine or p-phenylene diamine, are preferred from the viewpoint of affinity with polyester, cost, melt moldability and the like.

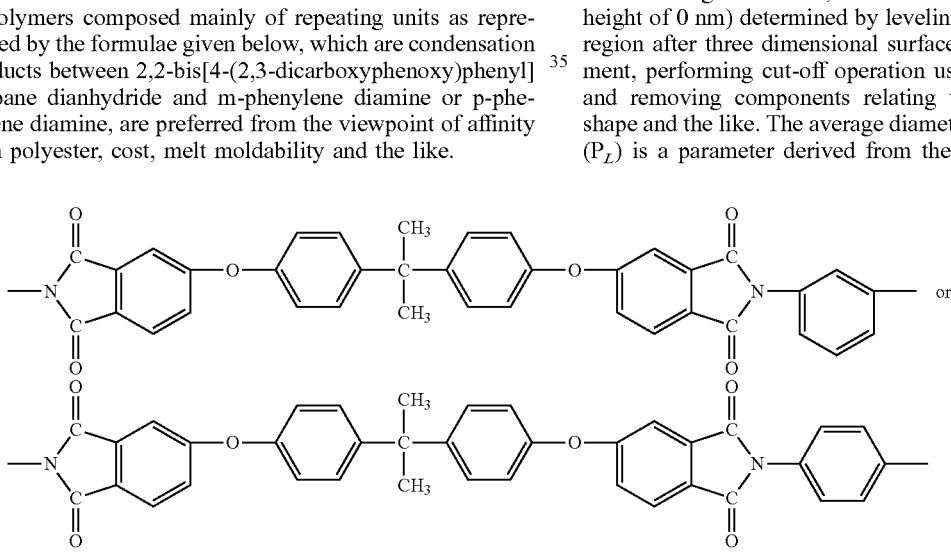

In the above formulae, n is an integer of 2 or more, preferably an integer of 20 to 50.

Such polyetherimide is available as commercial products with a trade name of Ultem® SABIC Innovative Plastics, which are known as Ultem® 1000, Ultem® 1010, Ultem® 1040, Ultem® 5000, Ultem® 6000, and Ultem® XH6050 series, as well as Extem® XH and Extem® UH.

The biaxially orientated polyester film preferably has a two or more layered structure having at least one layer (B-layer) that contains inactive particles with an average particle diameter of 0.050 to 0.50 μm. In this case, the B-layer functions to maintain traveling performance and is provided as the outermost layer on one side of the film. It is preferable for the other outermost layer to be one (A-layer) that functions to maintain smoothness, because such a two or more layered structure can serve efficiently to develop the features described below.

The biaxially orientated polyester film has a $P_L/V_L$ ratio of 0.3 to 1.2, $P_L$ and $V_L$ representing the average diameter of the convex portions and the average diameter of the concave portions, respectively, that are defined on the basis of a slice level with a height of 0 nm (reference plane) in a roughness curve determined from at least one surface using a three dimensional surface roughness meter. It is preferably 0.5 to 1.0. If the $P_L/V_L$ ratio is less than the lower limit, the protrusion frequency tends to be uneven, easily leading to the formation of bulky protrusions and a deterioration in traveling property and slitting property. If stored in the form of a film roll, the film may suffer from stress concentration in convex portions due to tight winding to cause their transfer to the smooth surface. When used as a magnetic recording medium, the film may suffer from a decline in the smoothness of the magnetic layer surface, which may cause drop-out. If the $P_L/V_L$ ratio is more than the upper limit, the film may suffer from a deterioration in slitting property or fail to maintain a required area ratio. Controlling the $P_L/V_L$ ratio within a specific range acts to achieve an even convex-concave frequency relative to the reference plane, thus serving effectively to disperse the stress concentration caused in convex portions by tight winding. Accordingly, it can serve for easy production of magnetic recording media with good electromagnetic conversion characteristics.

The reference plane is based, as described later in relation to measuring conditions, on a standard position (with a height of 0 nm) determined by leveling the entire measured region after three dimensional surface roughness measurement, performing cut-off operation using a specified filter, and removing components relating to noise, undulation, shape and the like. The average diameter of convex portions ($P_L$) is a parameter derived from the analysis of particles (several levels) described later in relation to measuring methods and represents the average of the diameters of the convex portions' cross sections that are exposed when cutting the film surface in the horizontal direction along the reference plane and assumed to be circular. The average diameter of convex portions ($P_L$) is determined by dividing the total area of the convex portions by the number of the convex portions and calculating the diameters of their assumed circular cross sections from the area per portion determined above. The average diameter of the concave portions ($V_L$) represents the average of the diameters of the concave portions' cross sections that are exposed when cutting the film surface in the horizontal direction along the reference plane and assumed to be circular. It is determined by dividing the difference between the measured area and the total area of the convex portions by the number of the concave portions and calculating the diameters of their assumed circular cross sections from the area per portion determined above.

For the biaxially orientated polyester film, the convex portions have an area ratio of 30 to 51% as determined on the basis of a slice level with a height of 0 nm (reference plane) in a roughness curve determined from at least one surface using a three dimensional surface roughness meter. It is more preferably 40% to 50%. If the area ratio of the convex portions is less than 30%, the film will suffer from deterioration in traveling property and variation in the protrusion frequency, leading to a deterioration in slitting property. If stored in the form of a film roll, the film may suffer from stress concentration in convex portions due to tight winding to push them up and transfer them frequently to the smooth surface. When used as a magnetic recording medium, the film may suffer from an increase in drop-out, possibly making it impossible to obtain good electromagnetic convert characteristics. If the area ratio of the convex portions is more than the upper limit, it will easily lead to a deterioration in traveling property.

The area ratio of the convex portions is a parameter derived from the analysis of particles (several levels) described later in relation to measuring methods and represents the percent proportion of the convex portions' cross sections that are exposed when cutting the film surface in the horizontal direction along the reference plane to the total measured area.

The biaxially orientated polyester film preferably satisfies the relation $0.4 \leq (M60/M10) \times 100 < 10$ for the protrusion density (M60) at the slice level with a height of 60 nm and the protrusion density (M10) at the slice level with a height of 10 nm in the roughness curve determined from at least one surface using a three dimensional surface roughness meter. The value of $(M60/M10) \times 100$ is more preferably 0.4 to 5, still more preferably 0.4 to 3. A smaller lower limit is better because transfer can be depressed more effectively, wherein the traveling property will decline to deteriorate the slitting property if it is too low. If the upper limit is 10 or more, the proportion of the number of protrusions with a height of 60 nm or more to the total number of protrusions will be too large. Accordingly, transfer will occur more easily and defects in the magnetic layer surface will not be depressed sufficiently, easily leading to drop-out. Controlling the protrusion density ratio $(M60/M10) \times 100$ within the above range will allow the slitting property and the depression of defects in the magnetic layer surface, which ensures good electromagnetic convert characteristics, to be simultaneously achieved at a high level.

The protrusion density (M0) is preferably 1,000 to 10,000/mm² at the slice level with a height of 0 nm (reference plane) in a roughness curve determined from at least one surface using a three dimensional surface roughness meter. It is more preferably 1,000 to 9,000/mm². If the protrusion density (M0) is less than 1,000/mm², the traveling property and slitting property will tend to deteriorate. If it is more than 10,000/mm², protrusions will occur too densely and bulky protrusions will be formed easily.

The protrusion density (M10) is preferably 6,000 to 20,000/mm² at the slice level with a height of 10 nm (reference plane) in a roughness curve determined from at least one surface using a three dimensional surface roughness meter. It is more preferably 9,000 to 15,000/mm², still more preferably 11,000 to 15,000/mm². If the protrusion density (M10) is outside the above range, the slitting property may deteriorate in some cases.

The average diameter of convex portions $(P_L)$ is preferably 2 to 25 μm at the slice level with a height of 0 nm (reference plane) in a roughness curve determined from at least one surface using a three dimensional surface roughness meter. It is more preferably 3 to 20 still more preferably 5 to 15 If the average diameter of the convex portions at the slice level with a height of 0 nm (reference plane) is more than 25 the traveling property and slitting property may deteriorate in some cases. A smaller average diameter of convex portion $(P_L)$ is more desirable, but if it is less than 2 it may become difficult to obtain protrusions having an effective height for the traveling property, and the slitting property may deteriorate in some cases.

The average diameter of concave portions $(V_L)$ is preferably 3 to 35 μm at the slice level with a height of 0 nm (reference plane) in a roughness curve determined from at least one surface using a three dimensional surface roughness meter. It is more preferably 5 to 30 μm. If the average diameter of the concave portions $(V_L)$ is less than 3 the area ratio may become too large and the traveling property may deteriorate in some cases. If it is more than 35 on the other hand, the average diameter of convex portions $(P_L)$ will also increase and requirements for the $P_L/V_L$ ratio and area ratio may not be met, easily leading to a deterioration in the traveling property and slitting property.

The protrusion density (M100) is preferably less than 5/mm² at the slice level with a height of 100 nm in a roughness curve determined from at least one surface using a three dimensional surface roughness meter. If the protrusion density (M100) is outside the above range, it will lead to magnetic recording media with increased drop-out.

If it is the B-layer surface that has such features, it is preferable because improvement in the slitting property and suppression of the smoothness decline in the magnetic layer surface can be achieved sufficiently.

Effective methods of controlling the surface having the above features (when applied to the B-layer) include adjustment of the ratio between the B-layer lamination thickness and the diameter of the particles contained as well as the diameter and content of the particles. In particular, the addition of two or more types of particles that differ in average particle size is preferable because it can serve effectively to control the surface having the above features. Furthermore, the adoption of multi-stage MD stretching and the control of the proportion of TD stretching ratios ((TD stretching 1)/(TD stretching 2)), which will be described later in relation to stretching methods, within a specific range will be effective.

A good method of controlling the above-mentioned $P_L/V_L$ ratio and the area ratio of the convex portions is to adopt a B-layer that contains at least two or more types of particles (L and M) that differ in average particle diameter and adjust the contents of the particle (L) and the particle (M) and the ratio t/d between the lamination thickness (t) of the B-layer and the maximum particle diameter (d) in the B-layer. The particle (L) preferably has an average particle diameter of 0.2 to 0.5 μm and preferably has a content of 0.005 to 0.3 mass %. The article (M) preferably has an average particle diameter of 0.1 to 0.3 μm and preferably has a content of 0.1 to 1 mass %. The particle (L) is larger in average particle diameter than the particle (M). It is preferable for adopting particles with different particle diameters so that the particle diameter ratio L/M between the particle (L) and the particle (M) is 2 to 5. The ratio L/M between the content of the particle (L) and that of the particle (M) is preferably 0.02 to 1 or less.

In controlling the above protrusion density (M100) and the protrusion density ratio (M60/M10)×100, the diameters of the particles contained are preferably limited to 0.5 μm or less; the largest particle (L) that can be contained preferably has a particle diameter of 0.3 to 0.5 μm; and the content of that particle is preferably 0.005 to 0.3 mass %. If the particle (L) has a particle diameter of more than 0.4 μm, its content is preferably 0.005 to 0.02 mass % and more preferably 0.005 to 0.015 mass %. Furthermore, the particle (M) preferably has an average particle diameter of 0.1 to 0.3 μm and preferably has a content of 0.1 to 1 mass %, more preferably 0.1 to 0.35 mass %. In addition, the ratio t/d between the lamination thickness (t) of the B-layer and the particle diameter (d) of the particle (L) contained in the layer is preferably controlled in the range of 1 to 5, more preferably 1.3 to 3. When several types of particles with different particle diameters are used in combination or the particles contained have a broad diameter distribution, it is preferable to adjust the ratio between the particle diameter (d) of the largest particle (L) and the lamination thickness within the above range.

The biaxially orientated polyester film preferably has a thickness of 3.5 to 4.5 μm. If the thickness is less than 3.5 μm, the rigidity and dimensional stability will deteriorate, leading to a tape with insufficient bending strength and a magnetic recording medium with poor electromagnetic convert characteristics. Furthermore, it will be difficult to prevent the protrusions on the B-layer surface from being pushed up toward the smooth surface (A-surface). If the film thickness is more than 4.5 μm, the tape length per roll will decrease, making it difficult to produce magnetic tapes with smaller size and higher capacity. As a thickness adjusting method, the thickness of biaxially stretched film can be adjusted by controlling the screw discharge rate in the melt-extruding of the polymer and also controlling the thickness of the unstretched film from the spinneret in the biaxially orientated polyester film production process.

The biaxially orientated polyester film preferably has a humidity expansion coefficient in the width direction of 0 to 6 ppm/% RH. If the humidity expansion coefficient is 6 ppm/% RH or less, it produces a magnetic recording medium that suffers from little significant deformation due to humidity change or undergoes deterioration in dimensional stability. The upper limit is more preferably 5.5 ppm/% RH, still more preferably 5 ppm/% RH. The humidity expansion coefficient represents a physical property that is influenced by the degree of tension in molecular chains and, as described later, it can be controlled by adjusting the proportion between the TD stretching 1 and the TD stretching 2 and also can be controlled by adjusting the total TD stretching ratio or its proportion to the MD stretching ratio. The humidity expansion coefficient decreases with an increasing proportion (TD1/TD2) between the TD stretching 1 and the TD stretching 2. The humidity expansion coefficient also decreases with an increasing total TD stretching ratio.

The term "MD" refers to the length direction (longitudinal direction) of the biaxially orientated polyester film and the term "TD" refers to the width direction (transverse direction) of the biaxially orientated polyester film.

The Young's modulus in the width direction is preferably 7 GPa or more, and more preferably 7 to 10 GPa from the viewpoint of controlling the humidity expansion coefficient in the width direction. If film with a Young's modulus in the width direction within the above range is used to produce a magnetic recording medium, it tends to ensure higher dimensional stability against environmental changes during recording in and reading from the magnetic recording medium. Young's modulus in the width direction can be controlled by changing the temperature and ratio of the TD stretching 1 and 2 which will be described later. In particular, the total TD ratio has a large influence, and the TD Young's modulus increases with an increasing total TD ratio.

The biaxially orientated polyester film more preferably has a Young's modulus in the length direction of 3.5 to 8 GPa. If film with a Young's modulus in the length direction within the above range is used to produce a magnetic recording medium, it ensures higher storage stability against tension during storage of the magnetic recording medium. Young's modulus in the length direction is more preferably 3.8 to 7.5 GPa and still more preferably 4 to 7 GPa. Young's modulus in the length direction can be controlled by changing the MD stretching ratio. The MD Young's modulus increases with an increasing MD ratio.

There are no specific limitations on the preferable particles to be contained in the B-layer of the biaxially orientated polyester film, and they may be either inorganic particles or organic particles. The use of a combination of two or more types of particles is preferable to develop a surface with good features. Specific examples include, for example, particles of inorganic materials such as clay, mica, titanium oxide, calcium carbonate, wet silica, dry silica, colloidal silica, calcium phosphate, barium sulfate, alumina silicate, kaolin, talc, montmorillonite, alumina, and zirconia; organic particles containing such components as various acrylic acids, styrene based resin, silicone, and imide; and core-shell type organic particles. Among others, monodisperse type spherical particles are particularly preferable from the viewpoint of controlling the average diameter of convex portion (PL) and protrusion density.

The surface of a B-layer containing such particles preferably has a center line surface roughness Ra of 3 to 15 nm and a 10-point average roughness Rz of 60 to 200 nm. More preferably, Ra is 5 to 12 nm and Rz is 70 to 150 nm. If the surface roughness parameters Ra and Rz are less than the lower limits, the traveling property and slitting property are likely to deteriorate, whereas if Ra and Rz are more than the upper limits, a magnetic recording medium produced by forming a back coat layer on the surface is likely to have poor electromagnetic convert characteristics due to transfer marks.

When the biaxially orientated polyester film is used as base film for a magnetic recording medium, it is preferable to provide a back coat layer (hereinafter referred to as BC layer) on the aforementioned characteristic surface because it serves to produce a high density magnetic recording medium. In particular, a magnetic recording medium having a magnetic layer produced from ferromagnetic hexagonal ferrite powder will show excellent electromagnetic conversion characteristics because not only the magnetic layer, but also the nonmagnetic layer and the BC layer itself have a small thickness and accordingly, the formation of a BC layer on the characteristic layer serves to prevent the surface of the BC layer from being significantly influenced by the protrusions attributed to the base-film and eliminate the formation of transfer marks on the magnetic surface, thus leading to an extremely flat surface.

The aforementioned biaxially orientated polyester film can be produced by, for example, a procedure as described below.

First, pellets of polyester are melted in an extruder, discharged through a spinneret, and solidified by cooling to produce a sheet. In doing so, it is preferable to filter the polymer through a fiber sintered stainless steel metal filter to remove unmelted components from the polymer.

Various additives including, for instance, compatibilizer, plasticizer, weathering agent, antioxidant, thermal stabilizer, lubricant, antistatic agent, brightening agent, coloring agent, electrically conductive agent, crystalline nucleating agent, ultraviolet absorber, flame retardant, flame retardation assistant, pigment, and dye may be added unless they impair the surface characteristics.

Subsequently, the sheet is biaxially stretched in the length and width directions, followed by heat treatment. To improve the dimensional stability of the average diameters $(P_L, V_L)$ and width sizes of the concave portions and convex portions in the reference plane, it is particularly preferable for the stretching step to contain multiple stage stretching in the vertical direction and two or more stage stretching in the width direction. Specifically, the stretch ratio in the transverse direction is higher than that in the longitudinal direction to achieve a high dimensional stability in the transverse direction and this results in protrusions of anisotropic shapes, making it difficult to calculate the $P_L/V_L$ ratio between the average diameter of the convex portions and that of the concave portions. If the longitudinal stretching is performed in multiple stages, the protrusions formed by this stretching are low in the degree of crystallinity and this is considered to serve for control of the average diameters $(P_L, V_L)$ and efficient control of the average diameter ratio $P_L/V_L$.

Regarding the stretching method, it is preferable to adopt a sequential biaxial stretching method that contains stretching in the length direction followed by two stage stretching in the width direction or a stretching method that contains simultaneous biaxial stretching followed by further stretching in the width direction.

The production method for the film is described below focusing on an example in which polyethylene terephthalate (PET) is used as typical polyester. However, this disclosure is not limited to PET film, but films of other polymers may be used. If, for example, polyethylene-2,6-naphthalene dicarboxylate, which has a higher glass transition temperature and a higher melting point, is used to produce polyester film, a proper way is to perform extrusion and stretching at higher temperatures than those shown below.

First, pellets of PET are prepared. PET is produced by either of the following processes. Specifically, they are: process (1) in which terephthalic acid and ethylene glycol, used as input materials, are subjected directly to esterification reaction to produce low molecular weight PET or oligomers, followed by condensation polymerization reaction using antimony trioxide, a titanium compound or the like as catalyst to provide a polymer, and process (2) in which dimethyl terephthalate and ethylene glycol, used as input materials, are subjected to ester interchange reaction to produce a low molecular weight material, followed by condensation polymerization reaction using antimony trioxide, a titanium compound, or the like as catalyst to provide a polymer.

If particles are to be added to the PET used for film production, it is preferable to disperse a predetermined quantity of the particles in ethylene glycol to form slurry, followed by adding this ethylene glycol slurry during the polymerization step. When adding particles, the particles will be dispersed smoothly if, for instance, the particles in the form of hydrosol or alcohol sol resulting from the synthesis of inactive particles are added directly without drying them. It is also effective to mix water slurry of inactive particles directly with PET pellets and knead them into the PET using a vented twin screw kneading extruder. As a method for adjusting the content of the inactive particles, it is effective to first carry out the above procedure to prepare master pellets containing inactive particles at a high concentration and dilute them, at the time of film production, with PET material that is substantially free of inactive particles to adjust the content of the inactive particles. In doing so, it is preferable for the particle-free PET material to have a higher intrinsic viscosity than the pellets that contain particles because this serves effectively in controlling the aforementioned protrusion density (M100).

Then, the PET pellets prepared above are dried under reduced pressure for 3 hours or more at 180° C., and subsequently supplied in a nitrogen flow or under reduced pressure, which is intended to prevent a decrease in intrinsic viscosity, to an extruder heated at 270° C. to 320° C., followed by extruding the material through a slit die and cooling it on a casting roll to provide an non-stretched film. In doing this, it is preferable to use any of various filters such as those of sintered metal, porous ceramic, sand, or metal gauze to remove foreign objects and altered polymers. In addition, the use of a gear pump to improve the quantitative feeding performance and achieve an intended t/d is extremely favorable to form the aforementioned characteristic surface. When layers are to be laminated to form a film, a good method is use two or more extruders and manifolds or confluent blocks to melt and stack a plurality of layers of different polymers.

Described below is a biaxial stretching method that uses a longitudinal stretching machine with several rollers in which the non-stretched film obtained above is stretched in the longitudinal direction (MD stretching) by the difference in circumferential speed among the rollers, followed by two-stage transverse stretching (TD stretching 1 and TD stretching 2) using a stenter.

Thus, the unstretched film is first subjected to MD stretching. Depending on the type of polymer used, a proper stretching temperature for the MD stretching can be determined on the basis of the glass transition temperature (Tg) of the unstretched film. It is preferably in the range of Tg−10° C. to Tg+15° C. and more preferably in the range of Tg to Tg+10° C. If the stretching temperature is lower than this range, film breakage can occur frequently to decrease the productivity, possibly making it difficult for two stage TD stretching to be performed stably after the MD stretching. The MD stretch ratio is 3.3 to 6 times, preferably 3.3 to 5.5 times. Implementation of the MD stretching in multiple, that is, two or more stages is effective in controlling the aforementioned protrusions diameter ($P_L$). In this step, the MD stretch ratio for the first stage is 75% or more, preferably 80% or more, of the total MD stretch ratio.

Then, a stenter is used to carry out TD stretching. For efficient control of the $P_L/V_L$ ratio between the average diameter of convex portions ($P_L$) and the average diameter of the concave portions ($V_L$), it is preferable to perform two stages of stretching in the TD direction in separate zones with different temperatures. The stretch ratio for the first stage stretching (TD stretching 1) is preferably 3.2 to 6.0 times and more preferably 3.3 to 5.8 times. The stretching temperature for the TD stretching 1 is preferably (cold crystallization temperature of MD-stretched film (hereinafter referred to as Tcc.BF)−5° C.) to (Tcc.BF+5° C.), more preferably (Tcc.BF−3° C.) to (Tcc.BF+5° C.).

Then, the second-stage stretching (TD stretching 2) is performed in a stenter. The stretching ratio for the TD stretching 2 is preferably 1.2 to 2 times, more preferably 1.3 to 1.8 times, and still more preferably 1.3 to 1.6 times. Adjusting the proportion of the TD stretch ratios (TD stretching 1)/(TD stretching 2) to 2 to 3 is effective in controlling the aforementioned $P_L/V_L$ ratio between the average diameter of convex portions ($P_L$) and the average diameter of the concave portions ($V_L$) in the range specified above. The stretching temperature for the TD stretching 2 is preferably (temperature for TD stretching 1+50) to (temperature for TD stretching 1+100)°C. and more preferably (temperature for TD stretching 1+60) to (temperature for TD stretching 1+90)°C.

Following this, the stretched film is maintained under tension or in a relaxed state in the width direction while being subjected to heat treatment. The heat treatment conditions preferably include a heat treatment temperature of 180° C. to 210° C. The upper limit of the heat treatment temperature is more preferably 205° C. and still more preferably 200° C. The lower limit of the heat treatment temperature is more preferably 185° C. and still more preferably 190° C. The heat treatment period is preferably 0.5 to 10 seconds and the relaxation rate is preferably 0.3% to 2%. After the heat treatment, the clip that grips the film is released to reduce the tension on the film while quenching it to room temperature. Subsequently, the film edge may be removed and wound up into a roll to provide a biaxially orientated polyester film. If there is a difference between the stretching temperature for the TD stretching 2 and the heat treatment temperature and the heat treatment temperature is higher than the aforementioned range, then the film will be relaxed easily and it will become difficult to achieve a humidity expansion coefficient required, leading to a decrease in dimensional stability. If the heat treatment temperature is too low, the crystallinity will tend to decrease and the base film will tend to decline in planarity in the magnetic recording medium production process, leading to deterioration in electromagnetic convert characteristics.

Then, a magnetic recording medium is produced by, for example, a procedure as described below.

For example, a support (biaxially orientated polyester film) for magnetic recording media as prepared above is slit to a width of 0.1 to 3 m and, while being conveyed at a speed of 20 to 300 m/min under a tension of 50 to 300 N/m, one of its surfaces is coated with a nonmagnetic coating solution by an extrusion coater to a thickness of 0.5 to 1.5 μm, followed by drying and further coating with a magnetic coating solution to a thickness of 0.1 to 0.3 μm. Subsequently, the support coated with a magnetic coating solution and a nonmagnetic coating solution is subjected to magnetic orientation treatment and dried at a temperature of 80° C. to 130° C. Following this, a back coat with a thickness of 0.3 to 0.8 μm is formed on the opposite surface, followed by calendaring and winding-up. The calendaring step is performed using a small test calendaring machine (metal roll, 7 stages) at a temperature of 70° C. to 120° C. and a linear pressure of 0.5 to 5 kN/cm. Subsequently, the film is aged at 60° C. to 80° C. for 24 to 72 hours and slit to a width of 12.65 mm to prepare a pancake. Then, this pancake is cut to a specific length and incorporated in a cassette to produce a cassette tape type magnetic recording medium.

The components of the magnetic paint or the like are adjusted, for example, as follows.

Hereinafter, "parts by mass" may be simply referred to as "parts."
Coating solution for magnetic layer formation
  Barium ferrite magnetic powder 100 parts
  [plate diameter: 20.5 nm, plate thickness: 7.6 nm, planarity ratio: 2.7, Hc: 191 ka/m (≈2400 oe) saturation magnetization: 44 Am²/kg, BET specific surface area: 60 m²/g]
  Polyurethane resin 12 parts
  Mass average molecular weight 10,000
  Sulfonic acid functional group 0.5 meq/g
  α-alumina HIT 60 (manufactured by Sumitomo Chemical Co., Ltd.) 8 parts
  Carbon black #55 (manufactured by Asahi Carbon Co., Ltd.) particles size 0.015 μm 0.5 parts
  Stearic acid 0.5 parts
  Butyl stearate 2 parts
  Methyl ethyl ketone 180 parts
  Cyclohexanone 100 parts
Coating solution for nonmagnetic layer formation
  Nonmagnetic powder α-iron oxide 100 parts
  Average major axis length 0.09 μm, BET specific surface area 50 m²/g
  pH7
  DBP oil absorption 27 to 38 ml/100 g
  Surface treatment layer $Al_2O_3$ 8 mass %
  Carbon black 25 parts
  Conductex SC-U (manufactured by Columbian Carbon)
  Vinyl chloride copolymer MR104 (manufactured by Zeon Corporation) 13 parts
  Polyurethane resin UR8200 (manufactured by Toyobo Co., Ltd.) 5 parts
  Phenylphosphonic acid 3.5 parts
  Butyl stearate 1.0 parts Magnetic recording media are applied favorably to, for example, data recording, backup of information such as computer data (for example, linear tape type recording media (LTO5, LTO6, next generation LTO tape (LTO7)), video and other digital image recording, and the like.

Examples of coat type magnetic digital recording medium to which the biaxially orientated polyester film can be applied include, for example, a magnetic recording medium having a magnetic layer formed by spreading a coating liquid composed of a ferromagnetic powder of barium ferrite or the like dispersed uniformly in a binder of polyurethane resin or the like.

The biaxially orientated polyester film can be used for optical films, polarizing plates produced thereof, and optical compensation films for liquid crystal display devices. As thinner and lighter notebook type personal computers and thinner electronic mobile devices are developed in recent years, there are strong demands for thinner optical compensation films for liquid crystal display devices and accordingly, the film will be applied favorably to developing thinner optical films having high transparency and travelling property.

The biaxially orientated polyester film can also be used as release film. Release films are produced by using polyester film as base material and coating it with releasable resin such as silicone resin and epoxy resin to form a layer. In particular, they are used for various releasing applications such green sheet manufacturing, release of liquid crystal polarizing plates, release of liquid crystal protective films, photoresists, and multilayer substrates. For polyester films, it is common to incorporate particles in an appropriate amount to form fine protrusions on the film surface to improve processing suitability characteristics such as lubricity and winding performance. As high precision devices are developed in recent years, there are increased demands for release films free of surface defects and having smooth surface properties and travelling property. Since the biaxially oriented polyester film has an ultrafine surface smoothness and travelling property, it can be suitably used as release film for various applications. Methods for measurement of properties and methods for evaluation of effects The methods for measurement of characteristic values and methods for evaluation of effects are as described below.

(1) Average Diameters ($P_L$ and $V_L$), Area Ratio of Convex Portions, and Protrusion Density (M100, M60, M10)

The three dimensional surface roughness was measured using Surf-corder ET-4000A manufactured by Kosaka Laboratory Ltd. under the following conditions, and then particle analysis (multiple levels) was carried out with the built-in analysis software. Measurement conditions are as follows. Slice levels were set at equal intervals of 10 nm, and at each slice level, the average diameter and density were determined at five different positions. Their average values were adopted for evaluation. A sample was set on the specimen table so that the X direction of the observed field of view agrees with the width direction of the biaxially orientated polyester film.

$P_L$: the average diameter of convex portions at the slice level of 0 nm (reference plane), $V_L$: the average diameter of the concave portions at the slice level of 0 nm (reference plane), Area ratio of the convex portions: percent ratio of the total area of the convex portions at the slice level of 0 nm (reference plane) to the area of the measured field of view, M100: protrusion density at the slice level of 100 nm, M60: protrusion density at the slice level of 60 nm, and M10: protrusion density at the slice level of 10 nm.

Equipment: Surf-corder ET-4000 A manufactured by Kosaka Laboratory Ltd.

Analysis software: i-Face model TDA31

Stylus end radius: 0.5 μm

Measuring field of view: X direction: 380 μm pitch: 1 μm Y direction: 280 μm pitch: 5 μm Needle pressure: 50 μN Measuring speed: 0.1 mm/s Cut-off value: low range—0.8 mm, high range—none Leveling: total range Filter: Gaussian filter (2D)

Magnification: 100,000 times

Conditions for particle analysis (a plurality of levels)

Output settings: mountain particles (at the time of $P_L$ diameter and protrusion density measurement), valley particles (at the time of $V_L$ diameter measurement)

Hysteresis width: 5 nm

Equal intervals of slice levels: 10 nm (2) Surface Characteristics, Center Line Surface Roughness Ra, and 10-Point Average Roughness Rz of B-Layer Using the equipment described in paragraph (1) above, the three dimensional roughness of the B layer surface was measured at ten different positions under the measuring conditions described above, and the measurements were averaged to determine the surface roughness Ra and the 10-point average roughness Rz.

Surface characteristics were evaluated according to the following criteria, and a specimen ranked as C was judged to be unacceptable in terms of smoothness.

AA: Rz is 100 nm or less,

A: Rz is more than 100 nm and 150 nm or less,

B: Rz is more than 150 nm and less than 200 nm, and

C: Rz is 200 nm or more.

(3) Humidity Expansion Coefficient and Dimensional Stability in the Width Direction Three measurements were taken in the film's width direction under the following conditions, and the average of the measurements is adopted to represent the humidity expansion coefficient.

Measuring equipment: thermomechanical analysis system TMA-50 manufactured by Shimadzu Corporation (humidity generator: wet atmosphere controller HC-1 manufactured by Advance Riko, Inc.)

Specimen size: film's length direction 10 mm×film's width direction 12.6 mm

Load: 0.5 g

Number of measurements taken: 3

Measuring temperature: 30° C.

Measuring humidity: The humidity is held at 40% RH for 6 hours and the size of a sample support was measured. Then, the humidity is increased to 80% RH in 40 minutes and held at 80% RH for 6 hours, followed by measuring the change ΔL (mm) in the size of the support in the width direction. The humidity expansion coefficient (ppm/% RH) was calculated by the equation given below.

$$\text{Humidity expansion coefficient (ppm/\% RH)} = 10^6 \times \{(\Delta L/12.6)/(80-40)\}$$

Dimensional stability was evaluated according to the following criteria, and a specimen ranked as C was judged to be unacceptable in terms of dimensional stability.

AA: humidity expansion coefficient is 5.5 ppm/% RH or less

A: humidity expansion coefficient is more than 5.5 ppm/% RH and 6.0 ppm/% RH or less, B: humidity expansion coefficient is more than 6.0 ppm/% RH and less than 6.5 ppm/% RH, and C: humidity expansion coefficient is 6.5 ppm/% RH or more (4) Lamination Thickness Ten fields of view were observed at different positions of a cross section under the conditions shown below and the thickness measurements [nm] taken were averaged to represent the thickness [nm] of the A-layer.

Measuring apparatus: H-7100FA transmission electron microscope (TEM) (manufactured by Hitachi, Ltd.)

Measuring conditions: accelerating voltage 100 kV

Measuring magnification: 10,000 times

Specimen preparation: ultramicrotomy

Observed surface: TD-ZD cross section (TD: width direction, ZD: thickness direction)

Number of measurements taken: three per field of view, measurements taken in 10 fields of view (5) Refractive Index Measurements were taken using a measuring device as described below according to JIS-K7142 (2008).

Equipment: Abbe refractometer 4T (manufactured by Atago Co., Ltd.)

Light source: sodium D-line

Measuring temperature: 25° C.

Measuring humidity: 65% RH

Mounting liquid: methylene iodide (except for using sulfur methylene iodide when the refractive index is 1.74 or more)

Average refractive index $\bar{n} = ((nMD+nTD+nZD)/3)$

Birefringence $\Delta n = (nMD-nTD)$ nMD: refractive index in the length direction of film nTD: refractive index in the width direction of film nZD: refractive index in the thickness direction of film (6) Young's Modulus Young's modulus of film was measured according to ASTM-D882 (1997). An Instron type tensile tester was used under the conditions shown below. Five measurements were taken and their average was adopted as Young's modulus.
- Measuring equipment: ultraprecision material testing machine MODEL5848 manufactured by Instron Corporation
- Specimen size:
  - for measuring Young's modulus in the film's width direction
    - 2 mm in the film's length direction×12.6 mm in the film's width direction (clamp interval is 8 mm in the film's width direction)
  - for measuring Young's modulus in the film's length direction
    - 2 mm in the film's width direction×12.6 mm in the film's length direction (clamp interval is 8 mm in the film's length direction)
- Rate of pulling: 1 mm/min
- Measuring environment: temperature 23° C., humidity 65% RH
- Number of measurements taken: 5

(7) Total Light Transmittance and Haze

Measurements were taken using the device shown below according to JIS-K 7361-1 (1997) and JIS-K 7136 (2000). The transmittance is measured at five positions in the length direction in the central region of a support and they are averaged to give the total light transmittance and haze.
- Measuring equipment: turbidity meter (NDH-5000) manufactured by Nippon Denshoku Industries Co., Ltd.
- Light source: white LED (5V3W)
- Measuring environment: temperature 23° C., humidity 65% RH
- Number of measurements taken: 5

Transparency was evaluated according to the following criteria, and a specimen ranked as C was judged to be unacceptable in terms of transparency.
- A: haze is 1% or less,
- B: haze is more than 1% and less than 2%, and
- C: haze is 2% or more.

(8) Average Diameter of Particles, Diameter of Maximum Particles, and Average Primary Particle Diameter of Agglomerate Particles A film's cross section is observed at a magnification of 10,000 times using a transmission electron microscope (TEM). In this instance, if particles of 1 cm or less are found on the photograph, observation by the TEM is performed at an increased magnification of 50,000 times. For the TEM observation, a section with a thickness of about 100 nm was prepared and 100 fields of view were observed at different positions. For all dispersed particles taken in the photograph, the diameter of the equivalent circle is determined and the distribution of the numbers of particles was plotted in a graph with the diameter of the equivalent circle on the horizontal axis and the number of particles on the vertical axis. The diameter of the equivalent circle at the peak is adopted as the average particle diameter of the particles. It should be noted that when agglomerate particles were found in the photograph taken at a magnification of 10,000 times, they were not included in the plot. If a plurality of groups of particles with different particle diameters are contained in a film, the above plot of the distribution of the number of particles with different equivalent circles can show two or more peaks. In this case, each peak is assumed to be attributed to the average particle diameter of the corresponding group of particles. The particle diameter of the largest particle refers to the diameter of the particle having the largest diameter found in the photograph at a magnification of 10,000 times.

The average primary particle diameter of agglomerate particles is determined from observation performed by the above equipment at a magnification of 200,000 times. First, 100 agglomerate particles are selected and the diameter of the equivalent circle of each primary particle in the agglomerate is determined. Then, it is plotted by the procedure described above and the diameter of the equivalent circle corresponding to the peak is adopted as the average primary particle diameter of the agglomerate particles.

(9) Content of Particles

First, 1 g of a polymer specimen was added to 200 ml of a 1N-KOH methanol solution and heat-refluxed to ensure the dissolution of the polymer. After completion of the dissolution, 200 ml of water was added to the solution and the resulting liquid was subjected to centrifugal separation to precipitate the particles, followed by removing the supernatant liquid. The sequence of addition of water to the particles, washing, and centrifugal separation was performed twice. The particles thus obtained were dried and their mass were measured to determine the content of the particles.

(10) Traveling Property

Two film specimens, stacked so that the A-surface of a specimen faces the B-surface of the other, are placed on a glass plate and a weight of 200 g is put on top of them (contact area 40 cm$^2$). One end (front in the moving direction) of the lower film specimen was fixed to the glass plate and one end (rear in the moving direction) of the upper film specimen was fixed to detector. The glass plate was moved by 5 mm at a speed of 2 mm/sec and the coefficient of static friction ($\mu$s) was calculated by the equation given below.

The Traveling property was evaluated according to the criteria given below.

$\mu$s=(initial tension)/(load of 200 g)
- A: $\mu$s=0.5 or less
- B: $\mu$s=more than 0.5 and 0.6 or less
- C: $\mu$s=more than 0.6

(11) Slitting Property

Film specimens were slit at varied slitting speeds into tapes with a width of 12.65 mm and the cut sections were visually observed, followed by evaluation according to the criteria given below. A specimen ranked as C was judged to be unacceptable in terms of slitting property.
- AA: No edge deformation found when slit at a speed of 120 m/min
- A: Edge deformation found when slit at a speed of 100 m/min or more and less than 120 m/min
- B: Edge deformation found when slit at a speed of 80 m/min or more and less than 100 m/min
- C: Surface creasing and edge deformation found when slit at a speed of less than 80 m/min

(12) Electromagnetic Conversion Characteristics

A film slit to a width of 1 m is caused to travel under a tension of 200 N and one of the surfaces of the support is coated with a magnetic paint and a nonmagnetic paint as described below, followed by slitting it to a width of 12.65 mm to prepare a pancake. Then, this pancake was cut to a length of 200 m and incorporated in a cassette to produce a magnetic recording tape specimen.

Hereinafter, "parts by mass" may be simply referred to as "parts."

Coating liquid for magnetic layer formation
Magnetic powder of barium ferrite 100 parts
(plate diameter: 20.5 nm, plate thickness: 7.6 nm, planarity ratio: 2.7, Hc: 191 kA/m (≈2400 oe)

saturation magnetization: 44 Am²/kg, BET specific surface area: 60 m²/g)
Polyurethane resin 12 parts
Mass average molecular weight 10,000
Sulfonic acid functional group 0.5 meq/g
α-alumina HIT 60 (manufactured by Sumitomo Chemical Co., Ltd.) 8 parts
Carbon black #55 (manufactured by Asahi Carbon Co., Ltd.)
particles size 0.015 μm 0.5 parts
Stearic acid 0.5 parts
Butyl stearate 2 parts
Methyl ethyl ketone 180 parts
Cyclohexanone 100 parts
Coating liquid for nonmagnetic layer formation
Nonmagnetic powder α-iron oxide 85 parts
Average major axis length 0.09 BET specific surface area 50 m²/g
pH7
DBP oil absorption 27 to 38 ml/100 g
Surface treatment layer Al₂O₃ 8 mass %
Carbon black 15 parts
Conductex® SC-U (manufactured by Columbian Carbon)
Polyurethane resin UR8200 (manufactured by Toyobo Co., Ltd.) 22 parts
Phenylphosphonic acid 3 parts
Cyclohexanone 140 parts
Methyl ethyl ketone 170 parts
Butyl stearate 1 part
Stearic acid 2 parts
Methyl ethyl ketone 205 parts
Cyclohexanone 135 parts For each of the above coating liquids, the components are kneaded together in a kneader. Zirconia beads with a diameter of 1.0 mm in an amount that is required to fill 65% of the capacity of the dispersion part are put in a lateral-type sand mill and a coating liquid was fed using a pump, followed by dispersion at 2,000 rpm for 120 minutes (substantially equal to the period for which the contents remained in the dispersion part). To the resulting dispersion liquid, 5.0 parts (for nonmagnetic layer formation) or 2.5 parts (for magnetic layer formation) of polyisocyanate was fed and in addition, 3 parts of methyl ethyl ketone was added. Filtration was performed through a filter with an average pore size of 1 μm to prepare a coating liquid for nonmagnetic layer formation or a coating liquid for magnetic layer formation.

The coating liquid for nonmagnetic layer formation obtained above was spread over a PET film so that the thickness would be 0.8 μm when dried, and after drying, the coating liquid for magnetic layer formation was spread so that the thickness of the resulting magnetic layer would be 0.07 μm when dried. While still in a wet state, the magnetic layer was subjected to orientation treatment using a cobalt magnet with a magnetic intensity of 6,000 G (600 mT) and a solenoid with a magnetic intensity of 6,000 G (600 mT), followed by drying. Subsequently, a back coat layer (100 parts of carbon black with an average particle size of 17 nm, 80 parts of calcium carbonate with an average particle size of 40 nm, and 5 parts of α-alumina with an average particles size of 200 nm, dispersed in polyurethane resin and polyisocyanate) spread so that the thickness would be 0.5 μm when calendered. Then, it was subjected to calendering treatment using a calendar at a temperature of 90° C. and a linear pressure of 300 kg/cm (294 kN/m), followed by curing at 80° C. for 72 hours. Furthermore, it was attached to an apparatus equipped with devices for feeding and winding of a slit tape such that nonwoven fabric and a razor blade were pressed against the magnetic layer, and the surface of the magnetic layer was cleaned using a tape cleaning device to provide a magnetic tape.

A recording head (MIG, gap 0.15 μm, 1.8 T) and a GMR reproducing head were attached to a drum tester and the output from the magnetic tape prepared above was measured. Signals were recorded with a track density of 16 KTPI and linear recording density of 400 Kbpi at a relative speed of 15 m/sec between the head and tape, and the ratio between the output and noise was determined to represent the electromagnetic conversion characteristics. The measurement obtained in Example 6 was assumed to be 0 dB, and a specimen was ranked as A when it was 2.0 dB or more, B when it was less than 2.0 dB and 0 dB or more, or C when it was less than 0 dB. Rank A is desirable, but rank B is practically acceptable.

(13) Drop-out

Recording and reproduction were performed as in paragraph (12) and the number of times of drop-out (number of drop-outs), that is, a 50% or more decrease in output over a length of 0.5 μm or more per meter of a fed tape, was measured, followed by evaluation according to the criteria shown below. Tape with less than 600 drop-outs is desirable for high capacity data backup.

AA: less than 100 drop-outs
A: 100 or more and less than 300 drop-outs
B: 300 or more and less than 600 drop-outs
C: 600 or more drop-outs

EXAMPLES

Examples will be illustrated below. Hereinafter, polyethylene terephthalate, polyethylene naphthalate, and polyetherimide are abbreviated as PET, PEN, and PEI, respectively.

(1-a) Preparation of PET Pellets:

First, 194 parts by mass of dimethyl terephthalate and 124 parts by mass of ethylene glycol were put in an ester interchange reaction apparatus and heated at 140° C. to ensure dissolution of the contents. Subsequently, 0.3 part by mass of magnesium acetate tetrahydrate and 0.05 part by mass of antimony trioxide were added while stirring the contents and subjected to ester interchange reaction while distilling out methanol at 140° C. to 230° C. Following this, 0.5 parts by mass of a 5 mass % solution of trimethyl phosphate in ethylene glycol (containing 0.025 parts by mass of trimethyl phosphate) and 0.3 parts by mass of a 5 mass % solution of sodium dihydrogen phosphate dehydrate in ethylene glycol (containing 0.015 part by mass of sodium dihydrogen phosphate dehydrate) were added.

Addition of the solution of trimethyl phosphate in ethylene glycol acts to decrease the temperature of the reactant. The stirring of the contents was continued while distilling out excess ethylene glycol, until the temperature of the reactant returned to 230° C. After the temperature of the reactant in the ester interchange reaction apparatus had reached 230° C. as described above, the reactant was transferred to a polymerization apparatus.

After the transfer, the reaction system was heated gradually from 230° C. up to 275° C. while decreasing the pressure down to 0.1 kPa. Both the time required to reach the final temperature and the time required to reach the final pressure were adjusted to 60 min. The stirring torque in the polymerization apparatus came to a predetermined value (depending on the specifications of the polymerization apparatus, the torque shown by polyethylene terephthalate with an intrinsic viscosity 0.55 in this polymerization apparatus was used as the "predetermined value") when the reaction was continued for 2 hours after a final temperature and final pressure were reached (a total of 3 hours after the onset of polymerization). The condensation polymerization reaction was stopped after purging nitrogen from the reaction system to restore atmospheric pressure, and the reaction product was discharged into cold water to produce a strand, which was cut immediately to provide polyethylene terephthalate having an intrinsic viscosity of 0.55, which is referred to as PET Pellet (material 1).

Using a rotary type vacuum polymerization apparatus, the above PET pellets (material 1) were subjected to long time heating treatment at a temperature of 230° C. under a reduced pressure of 0.1 kPa to carry out solid phase polymerization (material 1k). Longer heating treatment leads to a higher intrinsic viscosity. The intrinsic viscosity is 0.60 when treatment is performed for one hour, and the intrinsic viscosity is 0.70 when it is performed for five hours.

(1-b) Preparation of PEN Pellets:

First, 0.025 parts by mass of manganese acetate tetrahydrate and 0.005 parts by mass of sodium acetate trihydrate were added to a mixture of 128 parts by mass of 2,6-dimethyl naphthalene dicarboxylate and 60 parts by mass of ethylene glycol, and gradually heated from a temperature of 150° C. to a temperature of 240° C. to performed ester interchange reaction. In the middle of the reaction, 0.024 parts by mass of antimony trioxide was added when the reaction temperature reached 170° C. In addition, 0.042 parts by mass (corresponding to 2 mmol %) of tetrabutylphosphonium 3,5-dicarboxybenzenesulfonate was fed when the reaction temperature reached 220° C. Following this, the ester interchange reaction was continued and 0.023 parts by mass of trimethylphosphoric acid was added. Subsequently, the reaction product was transferred to a polymerization apparatus and heated to a temperature of 290° C. As condensation polymerization reaction is continued under a highly reduced pressure of 30 Pa, the stirring torque in the polymerization apparatus came to a predetermined value (depending on the specifications of the polymerization apparatus, the torque shown by polyethylene-2,6-naphthalate with an intrinsic viscosity 0.6 in this polymerization apparatus was used as the "predetermined value"). The condensation polymerization reaction was stopped after purging nitrogen from the reaction system to restore atmospheric pressure, and the reaction product was discharged into cold water to produce a strand, which was cut immediately to provide PEN pellets with an intrinsic viscosity of 0.6 (material 1b).

(2-a) Preparation of Particles-containing PET Pellets:

A co-rotating type vented biaxial kneading extruder was heated at 280° C., and 80 parts by mass of the aforementioned PET pellets (material 1) and 20 parts by mass of a 10 mass % water slurry of crosslinked polystyrene particles with an average particle diameter of 0.30 μm (containing 2 parts by mass of crosslinked polystyrene particles) were fed. The vent hole was maintained at a reduced pressure of 1 kPa or less and moisture removed to provide particle-containing pellets with an intrinsic viscosity of 0.62 that contained 2 mass % of crosslinked polystyrene particles (material 2a).

(2-b) Preparation of Particle-containing PET Pellets:

A co-rotating type vented biaxial kneading extruder was heated at 280° C., and 80 parts by mass of the aforementioned PET pellets (material 1) and 20 parts by mass of a 10 mass % water slurry of crosslinked polystyrene particles with an average particle diameter of 0.45 μm (containing 2 parts by mass of crosslinked polystyrene particles) were fed. The vent hole was maintained at a reduced pressure of 1 kPa or less and moisture removed to provide particle-containing pellets with an intrinsic viscosity of 0.62 that contained 2 mass % of crosslinked polystyrene particles (material 2b).

(2-c) Preparation of Particle-containing PET Pellets:

A co-rotating type vented biaxial kneading extruder was heated at 280° C., and 90 parts by mass of the aforementioned PET pellets (material 1) and 10 parts by mass of a 10 mass % water slurry of colloidal silica particles with an average particle diameter of 0.060 μm (containing 1 part by mass of colloidal silica particles) were fed. The vent hole was maintained at a reduced pressure of 1 kPa or less and moisture removed to provide particle-containing pellets with an intrinsic viscosity of 0.62 that contained 1 mass % of colloidal silica particles (material 2c).

(2-d) Preparation of Particles-containing PET Pellets:

A co-rotating type vented biaxial kneading extruder was heated at 280° C., and 80 parts by mass of the aforementioned PET pellets (material 1) and 20 parts by mass of a 10 mass % water slurry of colloidal silica particles with an average particle diameter of 0.10 μm (containing 2 parts by mass of colloidal silica particles) were fed. The vent hole was maintained at a reduced pressure of 1 kPa or less and moisture removed to provide particle-containing pellets with an intrinsic viscosity of 0.62 that contained 2 mass % of colloidal silica particles (material 2d).

(2-e) Preparation of Particle-containing PET Pellets:

A co-rotating type vented biaxial kneading extruder was heated at 280° C., and 80 parts by mass of the aforementioned PET pellets (material 1) and 20 parts by mass of a 10 mass % water slurry of colloidal silica particles with an average particle diameter of 0.20 μm (containing 2 parts by mass of colloidal silica particles) were fed. The vent hole was maintained at a reduced pressure of 1 kPa or less and moisture removed to provide particle-containing pellets with an intrinsic viscosity of 0.62 that contained 2 mass % of colloidal silica particles (material 2e).

(2-f) Preparation of Particle-containing PEN Pellets:

A co-rotating type vented biaxial kneading extruder was heated at 280° C., and 80 parts by mass of the aforementioned PEN pellets (material 1b) and 20 parts by mass of a 10 mass % water slurry of crosslinked polystyrene particles with an average particle diameter of 0.30 μm (containing 2 parts by mass of crosslinked polystyrene particles) were fed. The vent hole was maintained at a reduced pressure of 1 kPa or less and moisture removed to provide particle-containing pellets with an intrinsic viscosity of 0.6 that contained 2 mass % of crosslinked polystyrene particles (material 2f).

(2-g) Preparation of Particle-containing PEN Pellets:

A co-rotating type vented biaxial kneading extruder was heated at 280° C., and 80 parts by mass of the aforementioned PEN pellets (material 1b) and 20 parts by mass of a 10 mass % water slurry of crosslinked polystyrene particles with an average particle diameter of 0.45 μm (containing 2 parts by mass of crosslinked polystyrene particles) were fed. The vent hole was maintained at a reduced pressure of 1 kPa or less and moisture removed to provide particle-containing pellets with an intrinsic viscosity of 0.6 that contained 2 mass % of crosslinked polystyrene particles (material 2g).

(2-h) Preparation of Particle-containing PEN Pellets:

A co-rotating type vented biaxial kneading extruder was heated at 280° C., and 90 parts by mass of the aforementioned PEN pellets (material 1b) and 10 parts by mass of a 10 mass % water slurry of colloidal silica particles with an average particle diameter of 0.060 μm (containing 1 part by mass of colloidal silica particles) were fed. The vent hole was maintained at a reduced pressure of 1 kPa or less and moisture removed to provide particle-containing pellets with an intrinsic viscosity of 0.6 that contained 1 mass % of colloidal silica particles (material 2h).

(2-i) Preparation of Particle-containing PEN Pellets:

A co-rotating type vented biaxial kneading extruder was heated at 280° C., and 80 parts by mass of the aforementioned PEN pellets (material 1b) and 20 parts by mass of a 10 mass % water slurry of colloidal silica particles with an average particle diameter of 0.10 µm (containing 2 parts by mass of colloidal silica particles) were fed. The vent hole was maintained at a reduced pressure of 1 kPa or less and moisture removed to provide particle-containing pellets with an intrinsic viscosity of 0.6 that contained 2 mass % of colloidal silica particles (material 2i).

(2-j) Preparation of Particle-containing PEN Pellets:

A co-rotating type vented biaxial kneading extruder was heated at 280° C., and 80 parts by mass of the aforementioned PEN pellets (material 1b) and 20 parts by mass of a 10 mass % water slurry of colloidal silica particles with an average particle diameter of 0.20 µm (containing 2 parts by mass of colloidal silica particles) were fed. The vent hole was maintained at a reduced pressure of 1 kPa or less and moisture removed to provide particle-containing pellets with an intrinsic viscosity of 0.6 that contained 2 mass % of colloidal silica particles (material 2j).

(3) Preparation of Pellets of Two-component Composition (PET/PEI):

A co-rotating type vented biaxial kneading extruder having three kneading-paddle type kneader parts (manufactured by The Japan Steel Works, Ltd., screw diameter 30 mm, screw length/screw diameter ratio=45.5) was heated at a temperature of 280° C., and PET pellets prepared by the aforementioned procedure (material 1) and pellets of PEI Ultem (registered trademark) 1010 manufactured by SABIC Innovative Plastics were fed and melt-extruded at a shear velocity of 100 sec$^{-1}$ for a residence time of 1 minute to provide pellets of a two-component composition that contained 50 mass % of PEI. Pellets of the two-component composition prepared above had a glass transition temperature of 150° C. (material 3).

Example 1

Two extruders E1 and E2 were used. As materials for the A-layer, 80 parts by mass of PET pellets produced through solid phase polymerization performed for 4 hours (material 1k) and 20 parts by mass of pellets containing colloidal silica particles with an average particle diameter of 0.06 µm (material 2c) were dried at 180° C. for 3 hours under reduced pressure and then fed to the extruder E1 which was heated at 280° C. Similarly, as materials for the B-layer, 70 parts by mass of the PET pellets used for the A-layer (material 1k), 25 parts by mass of pellets containing colloidal silica particles with an average particle diameter of 0.1 µm (material 2d), and 5 parts by mass of pellets containing crosslinked polystyrene particles with an average particle diameter of 0.30 µm (material 2a) were blended, dried at 180° C. for 3 hours under reduced pressure, and fed to the extruder E2 which was heated at 280° C. To perform two layer lamination, they were layered in the T-die at a lamination thickness ratio (A-layer:B-layer) of 8:1, combined so that the B-layer would face the cast drum, and discharged onto a cast drum with a surface temperature of 25° C. while applying static electricity to ensure strong contact, cooling, and solidification, thus preparing an unstretched laminate film.

Using a roll type stretching machine, this unstretched laminate film was stretched 3.5 times at 88° C. in three stages in the length direction. This was achieved by stretching at a ratio of 2.7 times in the first stage, 1.23 times in the second stage, and 1.05 times in the third stage by the difference in circumferential speed between two pairs of rolls provided in each stage.

The uniaxially stretched film thus obtained was sent, with both ends held by clips, into a preheat zone controlled at a temperature of 90° C. in a tenter, then successively stretched 3.5 times (TD stretching 1) in the width direction (TD direction), which was perpendicular to the length direction, in a heating zone controlled at a temperature of 90° C., and stretched 1.4 times (TD stretching 2) in the width direction in a heating zone controlled at a temperature of 190° C. Following this, heat treatment was carried out at a temperature of 190° C. for 10 seconds in a heat treatment zone in the tenter and subjected to relaxation treatment by 0.5% in the width direction at a temperature of 150° C. Subsequently, the film was cooled uniformly down to 25° C. and the edges of the film were removed, followed by winding up on a core to provide a biaxially stretched polyester film with a thickness of 4.5 µm. The resulting biaxially orientated polyester film was found to be produced in a stable manner, and results of evaluation in physical properties indicated that it had good characteristics when used as magnetic tape as shown in the relevant table.

The tables given below show the material compositions, film production conditions, physical properties of biaxially orientated polyester film, characteristics of magnetic tape and the like for each Example and Comparative Example.

Example 2

Except for changing the particle concentration for B-layer formation as shown in the relevant table, the same procedure as in Example 1 was carried out to produce a biaxially stretched polyester film with a thickness of 4.5 µm.

Example 3

Except for changing the particle concentration for B-layer formation as shown in the relevant table, the same procedure as in Example 1 was carried out to produce a biaxially stretched polyester film with a thickness of 4.5 µm.

Example 4

Two extruders E1 and E2 were used. As materials for the A-layer, 74 parts by mass of PET pellets produced through solid phase polymerization performed for 4 hours (material 1k), 6 parts by mass of pellets of a two-component composition (material 3), and 20 parts by mass of pellets containing crosslinked polystyrene particles with an average particle diameter of 0.06 µm (material 2c) were dried at 180° C. for 3 hours under reduced pressure and then fed to the extruder E1, which was heated at 280° C. Similarly, as materials for the B-layer, 73.6 parts by mass of the PET pellets used for the A-layer (material 1k), 6 parts by mass of pellets of a two-component composition (material 3), 20 parts by mass of pellets containing colloidal silica particles with an average particle diameter of 0.2 µm (material 2e), and 0.4 part by mass of pellets containing crosslinked polystyrene particles with an average particle diameter of 0.45 µm (material 2b) were blended, dried at 180° C. for 3 hours under reduced pressure, and fed to the extruder E2, which was heated at 280° C. To perform two layer lamination, they were layered in the T-die at a lamination thickness ratio (A-layer:B-layer) of 6:1, combined so that the B-layer would face the cast drum, and discharged onto a cast drum with a surface temperature of 25° C. while applying static electricity to ensure strong contact, cooling, and solidification, thus preparing an unstretched laminate film.

Using a roll type stretching machine, this unstretched laminate film was stretched 3.5 times at 90° C. in three stages in the length direction. This was achieved by stretching at a ratio of 2.5 times in the first stage, 1.33 times in the second stage, and 1.05 times in the third stage by the difference in circumferential speed between two pairs of rolls provided in each stage.

The uniaxially stretched film thus obtained was sent, with both ends held by clips, into a preheat zone controlled at a temperature of 95° C. in a tenter, then successively stretched 3.5 times (TD stretching 1) in the width direction (TD direction), which was perpendicular to the length direction, in a heating zone controlled at a temperature of 90° C., and stretched 1.4 times (TD stretching 2) in the width direction in a heating zone controlled at a temperature of 195° C. Following this, heat treatment was carried out at a temperature of 190° C. for 10 seconds in a heat treatment zone in the tenter and subjected to relaxation treatment by 0.5% in the width direction at a temperature of 150° C. Subsequently, the film was cooled uniformly down to 25° C. and the edges of the film were removed, followed by winding up on a core to provide a biaxially stretched polyester film with a thickness of 4.2 µm. The resulting biaxially orientated polyester film was found to be produced in a stable manner, and results of evaluation in physical properties indicated that it had good characteristics when used as magnetic tape as shown in the relevant table.

Example 5

Except for changing the particle concentration for B-layer formation as shown in the relevant table, the same procedure as in Example 4 was carried out to produce a biaxially stretched polyester film with a thickness of 4.2 µm.

Example 6

Except for changing the particle concentration for B-layer formation as shown in the relevant table, the same procedure as in Example 4 was carried out to produce a biaxially stretched polyester film with a thickness of 4.2 µm.

Comparative Example 1

Except for changing the particle material and concentration for B-layer formation as shown in the relevant table, the same procedure as in Example 1 was carried out to produce a biaxially stretched polyester film with a thickness of 4.5 µm.

Comparative Example 2

Except for changing the particle material and concentration for B-layer formation as shown in the relevant table, the same procedure as in Example 4 was carried out to produce a biaxially stretched polyester film with a thickness of 4.2 µm.

Comparative Example 3

The particle material and concentration for B-layer formation were changed as shown in the relevant table, and the lamination thickness ratio (A-layer:B-layer) between the A- and B-layers was changed to 8 1. Except for performing longitudinal stretching under the conditions of stretching 3.5 times in one stage in the length direction, followed by stretching 3 times (TD stretching 1) in the width direction (TD direction) and subsequent stretching 1.6 times (TD stretching 2) in the width direction in a heating zone controlled at a temperature of 195° C., the same procedure as in Example 4 was carried out to produce a biaxially stretched polyester film with a thickness of 4.5 µm.

Comparative Example 4

Except for changing the particle material and concentration for B-layer formation as shown in the relevant table, the same procedure as in Example 4 was carried out to produce a biaxially stretched polyester film with a thickness of 4.5 µm.

Comparative Example 5

Except for changing the lamination thickness ratio (A-layer:B-layer) between the A- and B-layers to 13:1, the same procedure as in Example 4 was carried out to produce a biaxially stretched polyester film with a thickness of 4.2 µm.

Comparative Example 6

As materials for the A-layer, 80 parts by mass of PEN pellets (material 1b) and 20 parts by mass of pellets containing colloidal silica particles with an average particle diameter of 0.06 µm (material 2h) were dried at 180° C. for 3 hours under reduced pressure and then fed. Similarly, as materials for the B-layer, 70 parts by mass of the PEN pellets used for the A-layer (material 1b), 15 parts by mass of pellets containing colloidal silica particles with an average particle diameter of 0.1 µm (material 2i), and 15 parts by mass of pellets containing colloidal silica particles with an average particle diameter of 0.20 µm (material 2j) were blended, dried at 180° C. for 3 hours under reduced pressure, and fed to the extruder E2, which was heated at 280° C. To perform two layer lamination, they were layered in the T-die at a lamination thickness ratio (A-layer:B-layer) of 1:1.9, combined so that the B-layer would face the cast drum, and discharged onto a cast drum with a surface temperature of 25° C. while applying static electricity to ensure strong contact, cooling, and solidification, thus preparing an unstretched laminate film.

Using a roll type stretching machine, this unstretched laminate film was stretched 5 times at 140° C. in one stage in the length direction.

The uniaxially stretched film thus obtained was sent, with both ends held by clips, into a preheat zone controlled at a temperature of 135° C. in a tenter, stretched 5.3 times (TD stretching 1) in the width direction (TD direction), which was perpendicular to the length direction, and then further stretched 1.2 times (TD stretching 2) in the width direction in a heating zone controlled at a temperature of 160° C. Following this, it was heat-treated for 4 seconds in a heat treatment zone controlled at a temperature of 210° C. in the tenter, followed by removing the film edges and winding-up on a core to provide a biaxially stretched polyester film with a thickness of 5 µm.

Comparative Example 7

Except for changing the particle material and concentration for B-layer formation as shown in the relevant table and adjusting the lamination thickness ratio (A-layer:B-layer) to 6:1, the same procedure as in Comparative Example 6 was carried out to produce a biaxially stretched polyester film with a thickness of 4.2 μm.

TABLE 1

| | A-layer | | | | | B-layer | | | | |
|---|---|---|---|---|---|---|---|---|---|---|
| | Polymer | Thickness [μm] | Type of particles | Particle diameter [μm] | Concentration [wt %] | Polymer | Thickness [μm] | Type of particles | Particle diameter [μm] | Concentration [wt %] | Blending ratio |
| Example 1 | PET | 4 | spherical silica | 0.06 | 0.2 | PET | 0.5 | colloidal silica | 0.1 | 0.5 | 0.2 |
| | | | | | | | | organic particle | 0.3 | 0.1 | |
| Example 2 | PET | 4 | spherical silica | 0.06 | 0.2 | PET | 0.5 | colloidal silica | 0.1 | 0.3 | 0.4 |
| | | | | | | | | organic particle | 0.3 | 0.12 | |
| Example 3 | PET | 4 | spherical silica | 0.06 | 0.2 | PET | 0.5 | colloidal silica | 0.1 | 0.3 | 0.83 |
| | | | | | | | | organic particle | 0.3 | 0.25 | |
| Example 4 | PET + PEI | 3.6 | spherical silica | 0.06 | 0.2 | PET + PEI | 0.6 | colloidal silica | 0.2 | 0.4 | 0.02 |
| | | | | | | | | organic particle | 0.45 | 0.008 | |
| Example 5 | PET + PEI | 3.6 | spherical silica | 0.06 | 0.2 | PET + PEI | 0.6 | colloidal silica | 0.2 | 0.22 | 0.04 |
| | | | | | | | | organic particle | 0.45 | 0.008 | |
| Example 6 | PET + PEI | 3.6 | spherical silica | 0.06 | 0.2 | PET + PEI | 0.6 | colloidal silica | 0.2 | 0.36 | 0.05 |
| | | | | | | | | organic particle | 0.45 | 0.018 | |
| Comparative Example 1 | PET | 4 | spherical silica | 0.06 | 0.2 | PET | 0.5 | organic particle | 0.3 | 0.12 | — |
| Comparative Example 2 | PET + PEI | 3.6 | spherical silica | 0.06 | 0.2 | PET + PEI | 0.6 | colloidal silica | 0.1 | 0.018 | 1 |
| | | | | | | | | organic particle | 0.45 | 0.018 | |
| Comparative Example 3 | PET + PEI | 4 | spherical silica | 0.06 | 0.2 | PET + PEI | 0.5 | colloidal silica | 0.1 | 0.15 | 1.33 |
| | | | | | | | | colloidal silica | 0.2 | 0.2 | |
| Comparative Example 4 | PET + PEI | 4 | spherical silica | 0.06 | 0.2 | PET + PEI | 0.5 | colloidal silica | 0.06 | 0.35 | 1 |
| | | | | | | | | organic particle | 0.3 | 0.35 | |
| Comparative Example 5 | PET + PEI | 3.9 | spherical silica | 0.06 | 0.2 | PET + PEI | 0.3 | colloidal silica | 0.2 | 0.22 | 0.45 |
| | | | | | | | | organic particle | 0.45 | 0.1 | |
| Comparative Example 6 | PEN | 1.7 | spherical silica | 0.06 | 0.2 | PEN | 3.3 | colloidal silica | 0.1 | 0.3 | 1 |
| | | | | | | | | colloidal silica | 0.2 | 0.3 | |
| Comparative Example 7 | PEN | 3.6 | spherical silica | 0.06 | 0.2 | PEN | 0.6 | colloidal silica | 0.2 | 0.3 | 1.2 |
| | | | | | | | | organic particle | 0.3 | 0.36 | |

TABLE 2

| | B-layer surface parameters | | | | | | |
|---|---|---|---|---|---|---|---|
| | $P_L/V_L$ | Area ratio of convex portions [%] | $(M60/M10) \times 100$ [%] | M10 [×10000/mm²] | $P_L$ | $V_L$ | M100 [/mm²] |
| Example 1 | 0.55 | 43 | 2.6 | 1.6 | 14.2 | 25.6 | 3 |
| Example 2 | 0.54 | 42 | 2.3 | 1.3 | 14.8 | 28.2 | 4 |
| Example 3 | 0.88 | 48 | 4.2 | 1.2 | 16.3 | 18.6 | 5 |
| Example 4 | 0.71 | 47 | 5.1 | 1 | 25.4 | 35.8 | 8 |
| Example 5 | 0.71 | 43 | 2.7 | 1.1 | 26.6 | 37.7 | 3 |
| Example 6 | 0.48 | 32 | 7.7 | 1 | 18.5 | 38.4 | 10 |
| Comparative Example 1 | 0.26 | 21 | 2.5 | 0.6 | 28 | 106 | 5 |

TABLE 2-continued

| | | B-layer surface parameters | | | | | |
|---|---|---|---|---|---|---|---|
| | $P_L/V_L$ | Area ratio of convex portions [%] | (M60/M10) × 100 [%] | M10 [×10000/mm²] | $P_L$ | $V_L$ | M100 [/mm²] |
| Comparative Example 2 | 0.34 | 27 | 10 | 0.4 | 96 | 280 | 46 |
| Comparative Example 3 | 1.33 | 23 | 6.3 | 0.8 | 8.8 | 6.6 | 6 |
| Comparative Example 4 | 0.42 | 54 | 4.3 | 2.2 | 11.6 | 27.8 | 7 |
| Comparative Example 5 | 0.41 | 26 | 35 | 0.5 | 18.6 | 45 | 33 |
| Comparative Example 6 | 0.92 | 28 | 8.4 | 1.5 | 11.3 | 12.3 | 12 |
| Comparative Example 7 | 0.29 | 51 | 4 | 1.5 | 27.8 | 96 | 27 |

TABLE 3

| | Film characteristics | | | | | | Magnetic tape characteristics | |
|---|---|---|---|---|---|---|---|---|
| | t/d | Largest particle diameter [μm] | Humidity expansion coefficient [ppm/% RH] | Dimensional stability | Surface property | Traveling property | Slitting property | Electromagnetic conversion characteristics | Drop-out |
| Example 1 | 1.6 | 0.31 | 6.3 | B | A | A | B | A | A |
| Example 2 | 1.6 | 0.32 | 6.3 | B | A | A | AA | A | A |
| Example 3 | 1.4 | 0.32 | 6.3 | B | A | A | AA | A | A |
| Example 4 | 1.3 | 0.45 | 5.8 | A | B | B | B | B | B |
| Example 5 | 1.3 | 0.45 | 5.8 | A | B | A | AA | A | A |
| Example 6 | 1.3 | 0.46 | 5.8 | AA | B | B | B | B | B |
| Comparative Example 1 | 1.5 | 0.33 | 6.3 | B | A | C | C | B | A |
| Comparative Example 2 | 1.3 | 0.47 | 5.8 | A | B | C | C | C | C |
| Comparative Example 3 | 2.3 | 0.22 | 6 | B | B | C | C | B | B |
| Comparative Example 4 | 1.6 | 0.31 | 5.8 | A | B | C | C | B | B |
| Comparative Example 5 | 0.7 | 0.44 | 5.8 | A | C | B | B | C | C |
| Comparative Example 6 | 14.3 | 0.23 | 6.3 | B | B | C | C | B | C |
| Comparative Example 7 | 1.8 | 0.33 | 6.3 | B | B | C | C | C | C |

The invention claimed is:

1. A biaxially orientated polyester film having a $P_L/V_L$ ratio of 0.3 to 1.2, $P_L$ and $V_L$ representing an average diameter of convex portions and an average diameter of concave portions, respectively, defined on the basis of a slice level with a height of 0 nm (reference plane) in a roughness curve determined for at least one surface using a three dimensional surface roughness meter, and the convex portions accounting for an area ratio of 30% to 51% of the reference plane.

2. The biaxially orientated polyester film as set forth in claim 1, wherein the density of protrusions at slice levels assumed at intervals of 10 nm from the reference plane in the roughness curve determined for at least one surface using a three dimensional surface roughness meter satisfies:

0.4≤(M60/M10)×100<10 wherein M10 (number per mm²) is protrusion density at a slice level with a height of 10 nm and M60 (number per mm²) is protrusion density at a slice level with a height of 60 nm.

3. The biaxially orientated polyester film as set forth in claim 1, wherein the average diameter of convex portions ($P_L$) is 2 to 25 μm in the reference plane.

4. The biaxially orientated polyester film as set forth in claim 1, wherein the average diameter of concave portions ($V_L$) is 3 to 35 μm in the reference plane.

5. The biaxially orientated polyester film as set forth in claim 1, wherein the protrusion density (M100) is 5/mm² or less at the slice level with a height of 100 nm.

6. The biaxially orientated polyester film as set forth in claim 1, having a thickness of 3.5 to 4.5 μm.

7. The biaxially orientated polyester film as set forth in claim 1, having a humidity expansion coefficient in a width direction of 0 to 6 ppm/% RH.

8. A base film of coat-type digital signal magnetic recording media comprising the biaxially orientated polyester film as set forth in claim 1.

* * * * *